Nov. 10, 1936.　　　P. DAUTZENBERG　　　2,060,613
FOCUSING ADJUSTMENT FOR CAMERAS BY MEANS OF THE FINDER
Filed May 5, 1932
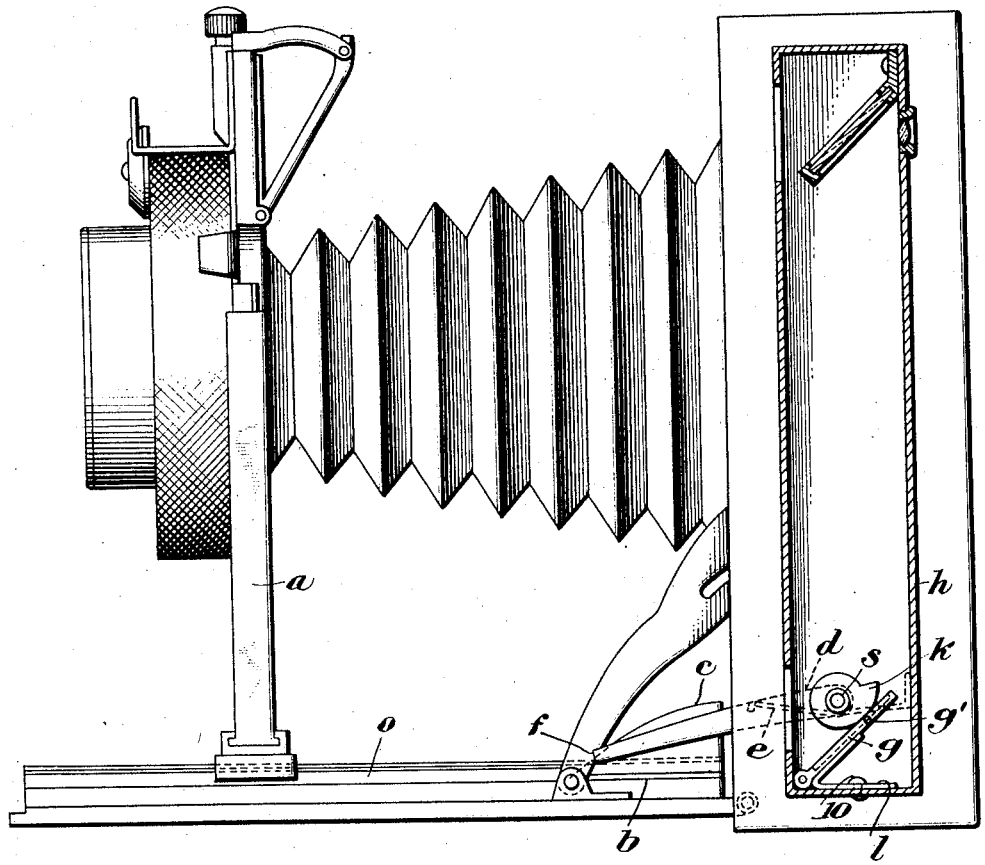
Inventor:
Paul Dautzenberg
by George C. Heinrich
Attorney Patented Nov. 10, 1936

2,060,613

UNITED STATES PATENT OFFICE 2,060,613

FOCUSING ADJUSTMENT FOR CAMERAS BY MEANS OF THE FINDER

Paul Dautzenberg, Aachen, Germany, assignor to Ehrhard Henke, Radeberg, Germany

Application May 5, 1932, Serial No. 609,415
In Germany January 31, 1930

3 Claims. (Cl. 95—44)

This invention relates to improvements in photographic cameras, particularly to a device for focusing by means of the finder, and it is the principal object of my invention to provide a curve adjustable through the adjustment of the objective which by means of suitable transmission means simultaneously operates one part of the finder.

Another object of my invention is the provision of a second curve associated with the transmission means from the normal curve to the finder.

A further object of my invention is the provision of means for compensating the differences in the normal curve arrangement caused by inaccurate construction of the camera, permitting the normal curve to be selected much steeper than in apparatus using one curve only and allowing the arrangement of the curve so as to shorten the operating lever near the bottom part of a box camera forming a closing flap.

These and other objects and advantages of my invention will become more fully known as the description thereof proceeds, and will then be more specifically defined in the appended claims.

In the accompanying drawing forming a material part of this disclosure:

The single figure illustrates a camera equipped with a focusing adjustment by means of the finder constructed according to my invention.

As illustrated, the objective carrier $a$ has secured thereto a member $b$ the inner end of which is widened to form an upwardly inclined curve $c$. This curve is engaged by a lever $d$ with its curve or cam face engaging end $f$. The lever $d$ is pressed into engagement with the curve by a spring $e$.

The opposite end of lever $d$ is attached to a spindle $s$ within the casing of the finder or distance meter $h$. A cam disc $k$ on spindle $s$ participating in its rotation, during the rotation of spindle $s$ engages through the intermediary of lever $d$ the lower mirror $g$ of the finder which is rotatably secured at one end and carries a pin or stud $g'$ with which contacts cam disk $k$ while a light, angular leaf spring $l$ has one of its branches secured to the camera wall by means of a rivet $l\theta$, while its other branch engages mirror $g$.

The device operates as follows:

Upon the displacement of the objective carrier for focusing to infinity, the member $b$, will participate in this movement and its curve $c$ will displace lever $d$ and will turn the mirror $g$ by the intermediary of spindle $s$ and cam disk $k$. If now the object to be photographed appears correctly in the finder, the camera is correctly adjusted for the required distance.

The construction of elements $c$, $g'$, and $k$ is contingent on the type and focal distance of the objective and on the type and transmission of the finder.

Upon closing the camera the lever $d$ is guided automatically into the camera casing by means of a guide strip $o$ or the extended strip $b$, and thus the finder will be automatically operated during the focusing.

It will be understood that I have described and shown one form of my invention, as an example only of the many possible ways to practically construct the same, and that I may make such changes in the general arrangement of my device and in the construction of the minor details thereof, as come within the scope of the appended claims, without departure from the spirit of my invention, and the principles involved.

Having thus described my invention, what I claim as new, and desire to secure by Letters Patent is:

1. A camera including its objective carrier, means to adjust the same, and finder comprising a curve adapted to be moved by the means for adjusting the objective carrier, means to transmit the objective carrier adjustment to the finder, and a second curve associated with this transmission means.

2. A camera including its objective carrier, means to adjust the same and finder, comprising a lever turnably arranged in said finder, a curve participating in the adjusting of the objective carrier for turning said lever, a spindle for said lever, a second curve arranged on the spindle of said lever, and a mirror for the finder adapted to be engaged and turned by said second-curve simultaneously with the adjustment of the objective carrier.

3. In a camera including its objective carrier and finder, a member secured to the objective carrier, a curve formed with the inner end of said member, a spring pressed lever having an abutment end engaging said curve, a spindle to which said lever is attached opposite to its abutment end, a cam disc on said spindle, a movable mirror on said finder, a stud on said mirror adapted to be engaged by said cam disc constituting a second curve for correctly adjusting the objective carrier upon the correct appearance of the object on which the camera is focused in the mirror of the finder.

PAUL DAUTZENBERG.